United States Patent [19]

Sumser et al.

[11] Patent Number: 5,611,202
[45] Date of Patent: Mar. 18, 1997

[54] TURBOCHARGED INTERNAL COMBUSTION ENGINE

[75] Inventors: Siegfried Sumser, Stuttgart; Erwin Schmidt, Baltmannsweiler; Herbert Schillings, Gerlingen, all of Germany

[73] Assignee: Mercedes-Benz AG, Stuttgart, Germany

[21] Appl. No.: 414,587

[22] Filed: Mar. 31, 1995

[30] Foreign Application Priority Data

May 11, 1994 [DE] Germany ................ 44 16 572.2

[51] Int. Cl.⁶ ............................ F02B 37/007; F02M 25/07
[52] U.S. Cl. .............................................. 60/605.2; 60/612
[58] Field of Search ............................. 60/605.2, 612

[56] References Cited

U.S. PATENT DOCUMENTS

| | | | |
|---|---|---|---|
| 4,009,574 | 3/1977 | Melchior | 60/605.2 |
| 4,250,711 | 2/1981 | Zehnder | 60/605.2 |
| 5,142,866 | 9/1992 | Yanagihara et al. | 60/605.2 |
| 5,406,796 | 4/1995 | Hiereth et al. | 60/605.2 |

FOREIGN PATENT DOCUMENTS

| | | | |
|---|---|---|---|
| 4120055 | 1/1992 | Germany . | |
| 4209469 | 4/1993 | Germany | 60/605.2 |
| 4231218 | 9/1993 | Germany . | |
| 54-148927 | 11/1979 | Japan | 60/605.2 |
| 673684 | 3/1990 | Switzerland . | |

*Primary Examiner*—Michael Koczo
*Attorney, Agent, or Firm*—Klaus J. Bach

[57] ABSTRACT

In a turbocharged internal combustion engine having at least two exhaust gas turbochargers arranged in parallel, each including a turbine connected by an exhaust conduit to the engine exhaust to be driven thereby and a compressor connected by an air supply conduit to the intake of the engine for supplying compressed air thereto, an exhaust gas recirculation conduit connected to the exhaust conduit upstream of the turbine leads to the air supply conduit of only one of exhaust gas turbochargers and a check valve is arranged in the air supply duct upstream of the jointure thereof with the exhaust gas recirculation conduit so as to involve only one of the exhaust gas turbochargers in the exhaust gas recirculation.

5 Claims, 2 Drawing Sheets

TURBOCHARGED INTERNAL COMBUSTION ENGINE

BACKGROUND OF THE INVENTION

The invention relates to a turbocharged internal combustion engine with at least two parallel turbochargers, each comprising a turbine having an inlet in communication with the engine exhaust and a compressor having an outlet in communication with the engine inlet.

Such a turbocharged internal combustion engine is shown, for example, in CH673,684 A5 wherein air is supplied to the engine by two turbochargers arranged in parallel in such a way that one of the turbochargers can be completely shut off by a cut-off valve and the other turbocharger has an exhaust gas inlet area which is divided into two sections, such that the exhaust gas flow can be partially shut off. Between the air inlet side and the exhaust side of the internal combustion engine, there is a controllable connection, which for the protection of the compressors, is opened when, for example, a full load operating point of the compressor should be maintained at a sufficient safety distance from the pump limit of the compressor.

It is the object of the present invention to provide an internal combustion engine with two exhaust gas turbochargers arranged in parallel in such a manner that the recirculation of exhaust gas can be realized in a simple and efficient manner even when the engine inlet air pressure is higher than the exhaust gas pressure in the engine exhaust conduit.

SUMMARY OF THE INVENTION

In a turbocharged internal combustion engine having at least two exhaust gas turbochargers arranged in parallel each including a turbine connected by an exhaust conduit to the engine exhaust to be driven by the engine exhaust gases and a compressor connected by an air supply conduit to the intake of the engine for supplying compressed air thereto, an exhaust gas recirculation conduit connected to the exhaust conduit upstream of the turbine leads to the air supply conduit of only one of exhaust gas turbochargers and a check valve is arranged in the air supply duct upstream of the jointure thereof with the exhaust gas recirculation conduit so as to involve only one of the exhaust gas turbochargers in the exhaust gas recirculation.

With an arrangement for the exhaust gas recirculation, wherein the recirculated exhaust gas is supplied via a compressor to the inlet air duct downstream of a check valve arranged in the inlet air duct, exhaust gas circulation is possible in a simple manner even if the air pressure on the engine inlet duct is higher than the exhaust gas pressure in the engine exhaust duct.

An arrangement wherein the exhaust gas compressor is the air compressor of the second exhaust gas turbocharger is particularly simple since the compressor of the second exhaust gas turbocharger is utilized at the same time as inlet air compressor and as exhaust gas compressor wherein the recirculated exhaust gas is supplied to the suction side of the compressor to be compressed alone or together with the inlet air. In such an arrangement, however, there are relatively high temperature resistance requirements for the compressor of the second exhaust gas turbocharger because of the high exhaust gas temperatures to which it may be exposed.

An arrangement, wherein the exhaust gas compressor is a separate additional compressor arranged, for example, at the turbine end of the second exhaust gas turbocharger, is advantageous as to thermal conditions since the thermal load of the inlet air compressor, which, in this case, is not exposed to exhaust gases, is relatively low and the thermally highly loaded separate exhaust gas compressor is small and designed for that purpose and is arranged at the exhaust gas inlet end of the exhaust gas turbocharger. In this case, the recirculated exhaust gas is supplied to the inlet air conduit only after the inlet air has been compressed, that is, to the pressure side of the compressor so that the inlet air compressor is not subjected to the high temperature exhaust gas.

In an arrangement, wherein the compressor of the first exhaust gas turbocharger is designed only for the handling of inlet air, and exhaust gas is compressed only in the compressor of the second exhaust gas turbocharger, only the compressor of the second exhaust gas turbocharger needs to be designed for operation as a combined inlet air and exhaust gas compressor. Then it is also possible to provide an inlet air intercooler downstream of the compressor of the first turbocharger since, in this case, only inlet air will pass through the intercooler which therefore will not be clogged by the deposition of exhaust gas particles.

The invention will become more readily apparent from the following description of two embodiments thereof.

DESCRIPTION OF THE PREFERRED EMBODIMENTS

Figure 1:
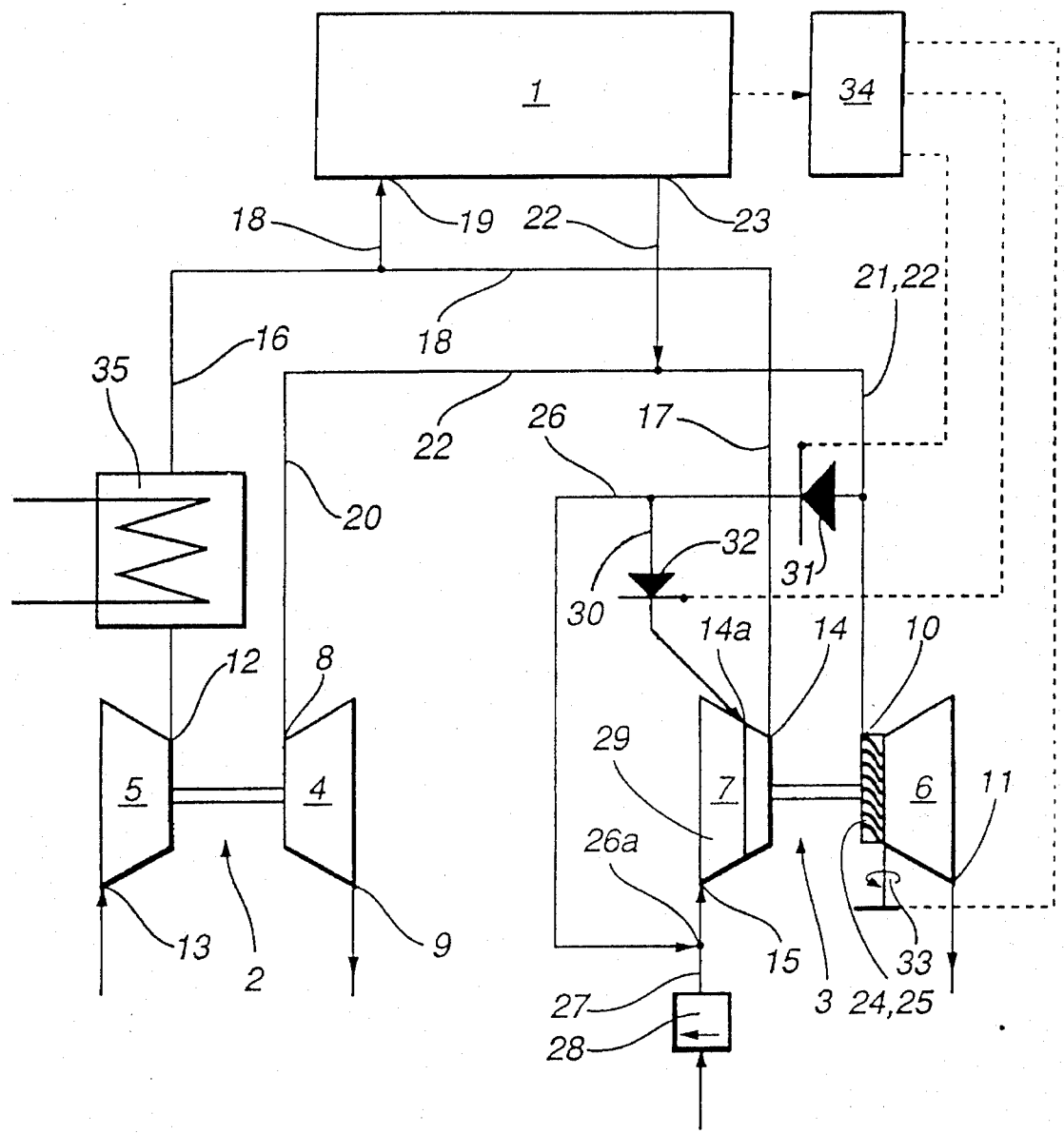
FIG. 1 shows schematically, a supercharged internal combustion engine with exhaust gas recirculation and with two turbochargers arranged in parallel and further with a check valve in the air supply duct for the compressor of the second turbocharger, wherein an exhaust gas recirculation duct is connected to the suction side and to the pressure side of the compressor of the turbocharger.

FIG. 1 shows a turbocharged internal combustion engine 1 with two exhaust gas turbochargers 2 and 3 which are arranged in parallel and each of which comprises a turbine 4, 6 with an inlet end 8, 10 and an outlet end 9, 11 and a compressor 5, 7 with a pressure side 12, 14 and a suction side 13, 15.

The pressure side 12, 14 of each compressor 5, 7 is connected to a conduit portion 16, 17 of a compressed air supply conduit 18 which leads to the engine intake 19 and each inlet end 8, 10 of the turbines 4, 6 is in communication with a conduit portion 20, 21 of an exhaust gas conduit 22 which is connected to the exhaust 23 of the internal combustion engine 1.

The turbine 6 of the second exhaust gas turbocharger 3 includes a control arrangement 25 for controlling the exhaust gas flow through this turbine 6 which control arrangement is a variable flow guide structure 24.

An exhaust gas recirculation conduit 26 extending from the conduit portion 21 of the exhaust conduit 22 of the turbine 6 of the second exhaust gas turbocharger 3 leads to a conduit section 27 of the air supply conduit 18 at the suction side of the compressor 7 of the second exhaust gas turbocharger 3 downstream of a check valve 28 arranged in the air supply conduit 18. The recirculated exhaust gas is compressed in an exhaust gas compressor 29 together with any air passing through the check valve 28, the exhaust gas compressor 29 being in the example of FIG. 1 the air compressor 7 of the second exhaust gas turbocharger 3.

If the compressor 7 is operating as a pure exhaust gas compressor 29 (that is, when the check valve 28 is closed), the gas pressure at the connection point 26a of the exhaust gas recirculation duct 22 with the conduit section 27 corresponds essentially to the exhaust gas pressure of the exhaust gas at the exhaust 23 of the internal combustion engine. If the exhaust gas is introduced downstream of the check valve 28 in an essentially unthrottled fashion, the energy balance is substantially more favorable than it is if the exhaust gas is introduced into the air supply conduit at ambient pressure since it would then have to be throttled whereby losses will occur.

Exhaust gas may alternatively be supplied to the compressor through an exhaust pipe 30 leading to the compressor 29 for introducing exhaust gas into the compressor at a pressure stage above ambient pressure, depending on engine operation.

During combined operation of the compressor 7, that is, when the check valve 28 is open and exhaust gas and fresh air are supplied to the engine inlet 19, the exhaust gas is preferably admitted to the pressure side 14 of the compressor 7 for a better energy balance, for example, into the diffuser channel 14a adjacent the impeller wheel of the compressor 7.

The exhaust gas recirculation conduit 26 and the exhaust gas pipe 30 each include a control valve 31, 32 each of which also is capable of acting as a check valve.

In the arrangement as shown in FIG. 1, the first exhaust gas turbocharger 2 is designed specifically for compressing air only. The exhaust gas recirculation is provided for exclusively by the compressor 7 of the second exhaust gas turbocharger 3 whose compressor 7 is designed for high temperature resistance because of the high exhaust gas temperatures that it might be subjected to.

The variable flow guide structure 24 with its operating mechanism 33 and the control valves 31, 32 are operated by means of a controller 34 which controls exhaust gas recirculation dependent on the operating parameters of the internal combustion engine 1. The connections between the controller 34 and the operating mechanism 33 and the control valves 31 and 32 are shown in FIGS. 1 and 2 by dashed lines.

The portion 16 of the air supply conduit 18 for the compressor 5 of the first turbocharger 2 includes a compressed intake air intercooler 35 as it is well known in the art. Because of the separation of intake air supply and the exhaust gas recirculation as provided for by the arrangement according to the invention the use of an intercooler in connection with the first turbocharger does not incur any problems since it cools only the air from the first compressor 5 which never includes any exhaust gases. Passing exhaust gas through an intercooler is problematic insofar as the deposition of exhaust gas particles in the intercooler substantially reduces its life expectancy.

Figure 2:
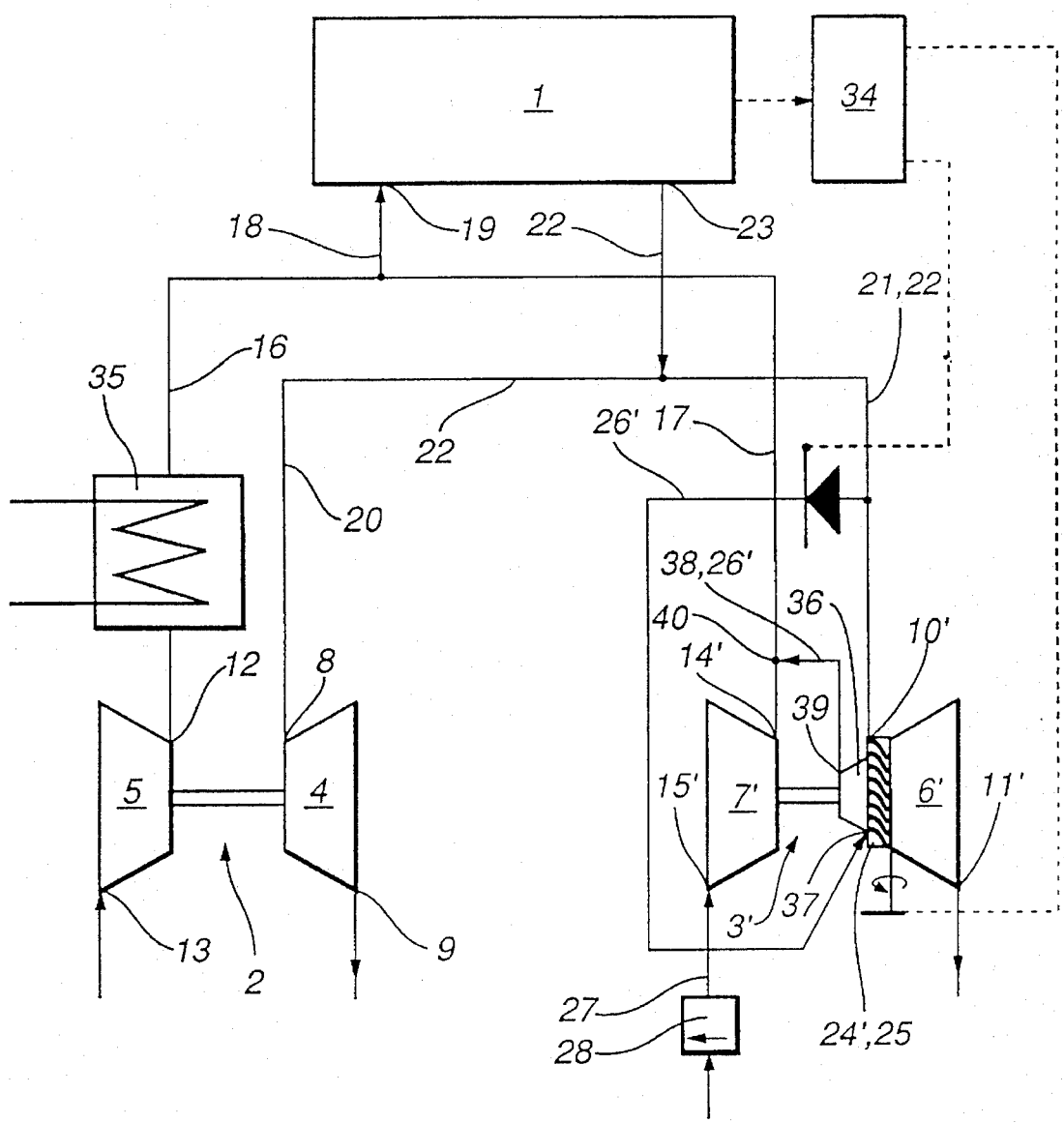
FIG. 2 shows schematically a turbocharged internal combustion engine like FIG. 1, wherein a separate combustion gas compressor is arranged at the turbine end of the exhaust gas turbocharger and an exhaust gas recirculation conduit is connected to the pressurized air side of the second exhaust gas turbocharger for supplying exhaust gas pressurized in the separate compressor to the pressurized air to be admitted to the engine.

FIG. 2 shows schematically, like FIG. 1, a turbocharged internal combustion engine wherein the same components are indicated by the same reference numeral and for similar components the respective reference numerals are used but are provided with apostrophes.

The turbocharged internal combustion engine 1 comprises two exhaust gas turbochargers 2 and 3' which are arranged in parallel and each of which includes a turbine 4, 6' with an inlet end 8, 10' and an outlet end 9, 11' and a compressor 5, 7' with a pressure side 12, 14' and a suction side 13, 15'.

The inlet end 8, 10' of each turbine 4, 6' is in communication with a conduit portion 20, 21 of an exhaust gas conduit 22 which is connected to the exhaust 23 of the internal combustion engine 1.

The turbine 6' of the second exhaust gas turbocharger 3' includes a control arrangement 25 for controlling the exhaust gas flow through the turbine 6' which control arrangement consists of a variable flow guide structure 24'.

At the turbine inlet end of the second exhaust gas turbocharger 3', there is an additional compressor 36 which includes an impeller mounted on the turbine shaft adjacent the turbine wheel of the turbine 6'.

An exhaust gas recirculation conduit 26' extending from the conduit portion 21 of the exhaust conduit 22 upstream of the turbine 6' of the second exhaust gas turbocharger 3' leads to the suction side 37 of the additional compressor 36. A conduit section 38 of the exhaust gas recirculation conduit 26' extends from the outlet 39 of the compressor 36 to the conduit portion 17 of the air supply conduit 18 at the pressure side 14' of the compressor 7' of the second exhaust gas turbocharger 3'.

In the embodiment according to FIG. 2, the check valve 28 is shown arranged at the suction side 15' of the compressor 7'. However, it may alternatively be arranged in the conduit portion 17 at the pressure side 14' upstream of the jointure 40 of the conduit section 38 of the exhaust gas recirculation conduit 26' with the conduit portion 17 of the air supply conduit 18.

In this arrangement, none of the air compressors is exposed to the hot exhaust gases which are always compressed by a dedicated relatively small compressor 36 so that only this compressor needs to be designed for the high exhaust gas temperatures. Since, furthermore, the exhaust gas is not mixed into the supply air at ambient pressure, it does not need to be throttled to the supply air pressure thereby increasing the efficiency of the arrangement.

What is claimed is:

1. A turbocharged internal combustion engine including at least first and second exhaust gas turbochargers arranged in parallel, each comprising a turbine with an inlet end and an outlet end and a compressor with a pressure side and a suction side, said internal combustion engine having an air intake with an air supply conduit having first sections leading to said compressors and second sections extending from the pressure side of each compressor to an engine intake, said engine having an exhaust with an exhaust conduit connected to the inlet end of each of said turbines, the turbine of said second exhaust gas turbocharger including a control arrangement for controlling the flow of exhaust gases therethrough, and an exhaust gas recirculation conduit extending between said exhaust conduit and said first section of the air supply conduit of said second exhaust gas turbocharger so that the exhaust gas recirculated through said recirculation conduit can be compressed by said second exhaust gas turbocharger, said first section of said air supply conduit of said second turbocharger including a check valve and said recirculation conduit being connected to said exhaust conduit upstream of the turbine of said second exhaust gas turbocharger and to said air supply conduit downstream of said check valve.

2. An internal combustion engine according to claim 1, wherein an exhaust gas pipe extends from the exhaust gas recirculation conduit to the compressor of said second exhaust gas turbocharger and is connected thereto so as to feed into a diffuser portion disposed at the pressure side of said compressor so that the exhaust gas conducted through said exhaust gas pipe does not flow fully through said compressor.

3. An internal combustion engine according to claim 1, wherein the compressor of said first exhaust gas turbocharger is designed for withstanding normal air temperatures for handling engine intake air and the compressor of said second exhaust gas turbocharger is capable of withstanding high temperatures for handling also exhaust gases, the arrangement being such that exhaust gas recirculation is attended to only by said second exhaust gas turbocharger.

4. An internal combustion engine according to claim 1, wherein an intercooler is arranged only in the second section of said air supply conduit of said first turbocharger.

5. An internal combustion engine according to claim 3, wherein an intercooler is arranged only in said second section of said air supply conduit of said first turbocharger.

* * * * *